Patented Jan. 27, 1953

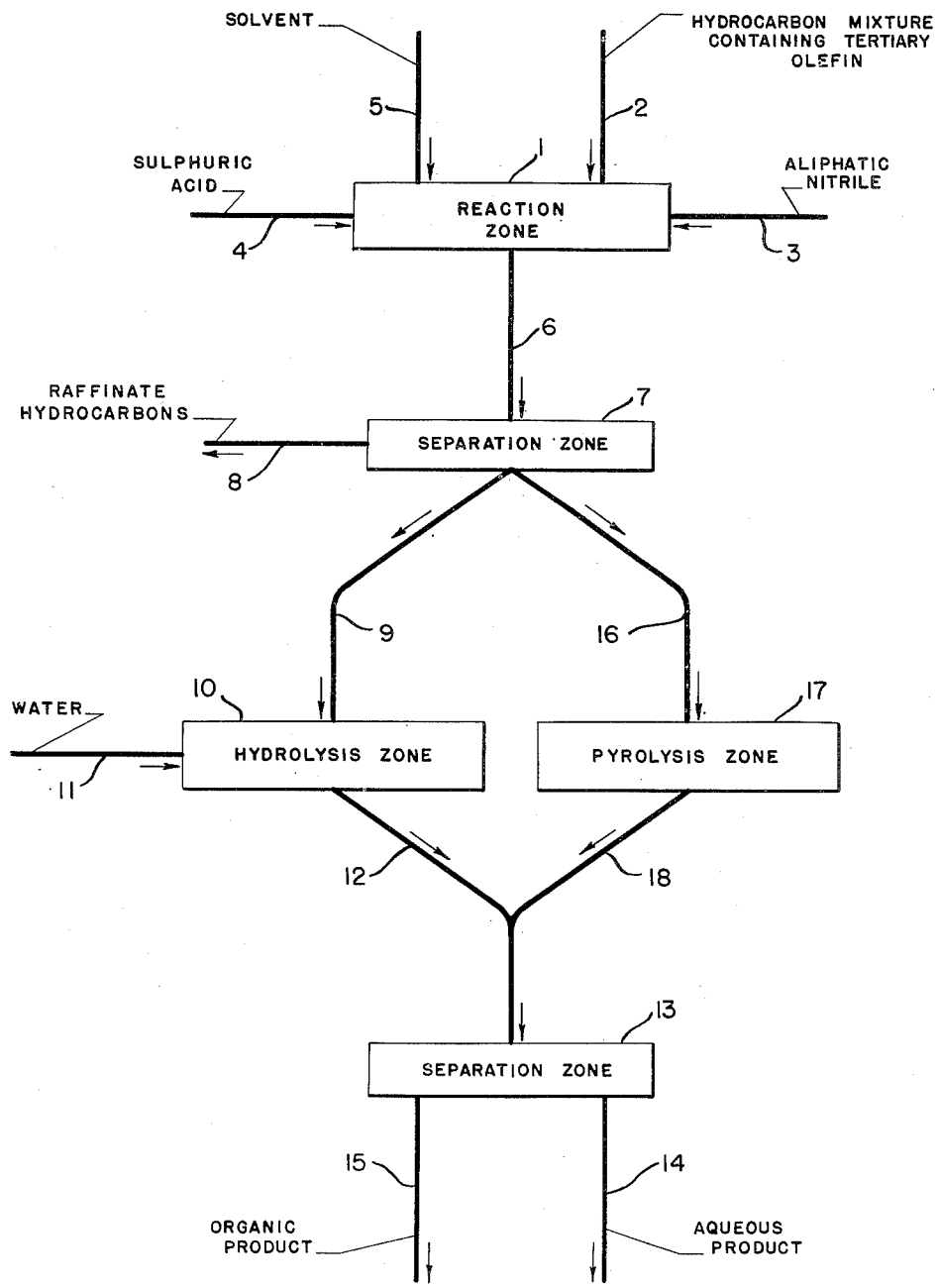

2,626,959

UNITED STATES PATENT OFFICE 2,626,959

PROCESS FOR EXTRACTION OF OLEFINIC HYDROCARBON MIXTURES

Joseph A. Chenicek, Bensenville, Ill., assignor to Universal Oil Products Company, Chicago, Ill., a corporation of Delaware Application February 6, 1951, Serial No. 209,711

9 Claims. (Cl. 260—561)

This invention relates to a hydrocarbon separation process for the removal of a specific class of olefinic hydrocarbons from mixtures of the same with other hydrocarbons of isomeric, saturated, or other unsaturated structures. More specifically, the invention concerns a method of hydrocarbon extraction utilizing a specific class of separating agents which react with the olefinic hydrocarbon components to be removed and recovering said olefinic hydrocarbon components from the separating agent, if desired, by means of a procedure which may be adapted to a continuous method of extraction.

One object of this invention is to provide a process for the separation of a specific class of olefinic hydrocarbons from hydrocarbon mixtures containing the same wherein the extracting agent is readily recoverable from the process flow in a condition which may be recycled to the extraction stage of the process. Another object of the invention is to provide an extraction method for the recovery of certain classes of olefinic hydrocarbons from mixtures thereof with isomers and other closely boiling hydrocarbon components incapable of being separated by simple fractional distillation means.

In one of its embodiments the present invention relates to a hydrocarbon separation process for segregating from a hydrocarbon mixture an olefinic hydrocarbon containing an active ethylenic linkage in which one of the ethylenic carbon atoms of said olefin is substituted by a member of the group consisting of dialkyl and monophenyl which comprises reacting said hydrocarbon mixture with an alkyl nitrile dissolved in an organic solvent containing from about 10 to about 30% by weight of concentrated sulfuric acid, based on the quantity of said nitrile, and separating a raffinate phase comprising non-reacted hydrocarbons from an extract phase comprising the reaction product of said alkyl nitrile and said olefinic hydrocarbon containing the active ethylenic linkage.

A more specific embodiment of the present invention concerns a process for the separation of a tertiary olefin from a hydrocarbon mixture containing said olefin which comprises reacting said hydrocarbon mixture at a temperature of from about 0° to about 50° C. and at a pressure sufficient to maintain substantially liquid phase with an alkyl nitrile dissolved in an organic solvent for said nitrile and containing from about 10 to about 30% by weight of concentrated sulfuric acid, based on the quantity of said nitrile in said solvent, separating a raffinate phase comprising nonextracted hydrocarbons from an extract phase comprising the reaction product of said alkyl nitrile and said tertiary olefin, diluting said extract phase with an equal volume of water, heating the resulting dilute extract phase to liberate said tertiary olefin and separating the resulting aqueous and tertiary olefinic hydrocarbon phases.

The present method of separation utilizing a separating agent comprising an aliphatic nitrile depends for its effectiveness on the reaction of a definite class of olefinic hydrocarbons with the separating agent in the presence of concentrated sulfuric acid and thereafter separating the reaction product of the reactive olefin and aliphatic nitrile from unreacted raffinate. In accordance with this process, the reaction product may be separated from the hydrocarbon mixture and may be treated in a specified manner to recover the extracted hydrocarbon or hydrocarbons in their original form from the reaction product. The reaction upon which the method of extraction is based is believed to involve the intermediate sulfation of the alkyl or phenyl substituted carbon atom of the ethylenic linkage present in the tertiary olefinic and phenyl substituted olefinic components charged to the present process, followed by hydrolysis of the sulfate radical substituted on one of the carbon atoms of the ethylenic linkage and enolization of the hydrolyzed nitrile-olefin reaction product to the keto-form of the product. Thus, in the case of the tertiary olefin isobutylene, which contains a dialkyl substituted ethylenic carbon atom, the reaction is believed to occur in a manner represented by the following empirical equations:

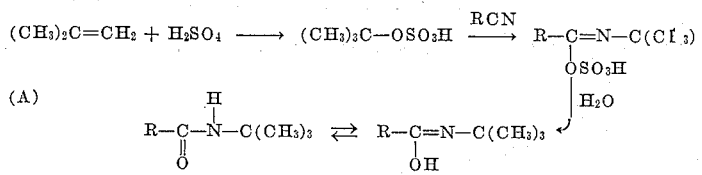

(A)

The reaction product of the initial stage of the separation process, represented by the compound (A) in the above equation for isobutylene, may be thereafter subjected to pyrolysis at reaction conditions sufficient to yield the initial aliphatic nitrile and free isobutylene in accordance with the following mechanism:

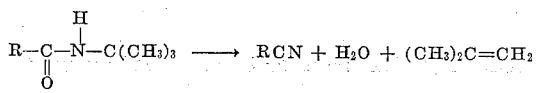

The above empirical equations, although believed to represent the typical reaction mechanism involved in the present separation process are not intended to define strictly the theoretical basis of the present invention nor are the equations intended to restrict in any manner the scope of the invention in accordance with the above proposed mechanism.

Hydrocarbon mixtures which may be utilized as charging stocks in the present separation process may be derived from any suitable source and may contain, in addition to the various isomeric olefins, other classes of hydrocarbons of saturated or unsaturated character, such as the aliphatic parraffins, the cycloaliphatic naphthenes, and aromatic hydrocarbons of either benzenoid or polycyclic structure. Common sources of such hydrocarbon mixtures include the normally liquid or normally gaseous products of isomerization reactions, the products of thermal or catalytic cracking of petroleum fractions, the polymerization products of lower molecular weight olefins, such as polymerized ethylene, propylene, the butylenes, amylenes, etc., the generally mixed olefinic and aromatic products of thermal or catalytic reforming processes, the products of hydrocarbon dehydrogenation reactions, and is particularly applicable to azeotropic mixtures of isomeric hydrocarbons or constant boiling mixtures of hydrocarbons in which simple fractional distillation or extractive distillation procedures are inoperable to separate the individual components of the mixture. Thus, a mixture of the various butylene isomers may be subjected to extraction utilizing the present process to recover or remove isobutylene therefrom. Other tertiary olefins which may be selectively extracted by means of the present extraction process from hydrocarbon mixtures containing the same include such specific compounds as 2-methylbutene-1, 2-methylbutene-2, 2-methylpentene-1, 2-methylpentene-2, 3-methylpentene-2, 2,3-dimethylbutene-1, 2-ethylpentene-1, 3-ethylpentene-2, 3,4-dimethylpentene-2, 2,3,3-trimethylbutene-1, and numerous other homologs and isomers. The procedure may likewise be extended to the separation of vinyl aromatic or alpha-substituted vinyl aromatic hydrocarbons from mixtures with other hydrocarbons containing the same. A separation which is particularly convenient by means of this process and which is not readily obtained by means of other separation processes heretofore known, is the recovery of styrene or alpha-methyl styrene from a mixture thereof with ethylbenzene, as for example, a mixture produced by the dehydrogenation of ethylbenzene, which is desirably separated to recover substantially pure styrene for uses in which the mixture is undesirable. Many other applications of the present process are readily evident to those skilled in the hydrocarbon separation art, and are within the purview of the present invention.

One of the integral components of the present separating agent which is essential to the effectiveness of the reaction involved in the separation method, is an aliphatic nitrile which reacts with the tertiary olefin or with the alpha penyl-substituted olefinic hydrocarbon component of the mixture subjected to separation to form an amide derivative in the presence of relatively concentrated sulfuric acid and a sufficient amount of water to effect hydrolysis of the sulfate intermediate product believed to be formed during the reaction. Suitable aliphatic nitriles utilizable in the process include such typical compounds as acetonitrile (methylcyanide), propionitrile, (ethylcyanide), butyronitrile, alphamethylbutyronitrile, 2-ethylbutyronitrile, isobutyronitrile, valeronitrile, capronitrile, isocapronitrile and other isomers and homologs having the general structure of the alkyl nitriles and preferably containing fewer than about 10 carbon atoms per molecule. In general, the nitrile components of the separating agent is desirably selected on the basis of its boiling point such that in the subsequent recovery of the initial olefin and nitrile from the reaction product formed in the present separation process, the nitrile and olefinic hydrocarbons may be readily separated from each other by fractional distillation. The quantity of the aliphatic nitrile utilized in the present separating agent is at least an equimolar proportion based on the quantity of tertiary olefin or ethylenically phenyl substituted olefin present in the hydrocarbon charging stock, and preferably the molar ratio of nitrile to reactive, separable olefin is from about 1.5 to 1 to about 4 to 1.

The sulfuric acid component of the separating agent is specified as an acid of sufficient strength to effect substantially complete sulfation of the olefin present in the reaction mixture, and for this purpose a relatively concentrated sulfuric acid containing less than about 10% by weight of water, and preferably from about 95 to about 98.5% sulfuric acid, is utilized. The quantity of sulfuric acid present in the separating agent is preferably at least sufficient to provide an equimolar ratio, and preferably from about 2 to about 5 molar proportions, of sulfuric acid to the reactive olefinic hydrocarbon involved in the separation. Except for the long chain or high molecular weight olefinic hydrocarbons to be separated containing more than about 10 carbon atoms per molecule, the quantity of sulfuric acid generally found to be suitable for the reaction is from about 15 to about 30% by weight of the olefin undergoing reaction in the process.

The separating agent containing the aliphatic nitrile and sulfuric acid also desirably contains an organic solvent which is miscible with one or more of the organic components of the reaction mixture or which preferably solubilizes the various components of the reaction mixture into a homogeneous, single phase mixture. Suitable solvents for this purpose are selected from the general class of organic solvents, including the dialkyl ethers, the halo-hydrocarbons, certain organic acids, and others. Typical of the preferred solvents for this purpose are the dialkyl ethers such as methylethylether, ethylpropylether, di-isopropoether, dibutylether, and homologous ethers which may readily be maintained in liquid phase during the reaction and which do not interfere with the separation of the other reactants or otherwise react with the aliphatic nitrile or sulfuric acid components. Other useful solvents particularly adapted to the reaction are such organic compounds as glacial acetic acid, dioxane, ethylenedichloride and others. The solvent is preferably selected so as to be readily separated from the other components of the reaction mixture and particularly the olefinic hydrocarbon extracted during the process.

Separation of the above indicated specific class of olefinic hydrocarbons by means of the present process is obtained by intimately contacting the charging stock comprising one of the aforementioned hydrocarbon mixtures with the separating agent containing the aliphatic nitrile, the sulfuric acid sulfating agent, and the organic solvent at a temperature of from about 0° to about 50° C. preferably from about 10° to about 35° C., and at an ambient pressure sufficient to maintain the reaction mixture in substantially liquid phase condition. The reaction is allowed to continue at the above reaction conditions for a period sufficient to effect substantially complete reaction of the reactive olefins in the hydrocarbon mixture with the aliphatic nitrile and sulfuric acid reactants, generally within a period of from about one-half to about five hours in duration. During the reaction, the mixture is preferably stirred, shaken or otherwise agitated to effect intimate contact between the hydrocarbons and separating agent. Following the indicated reaction to the desired stage of completion, water may be added to the reaction mixture prior to phase separation of the raffinate from the extract phases, or the phases may be separated, for example, by decantation, and the resulting phases individually treated, if desired, to recover the extracted olefinic hydrocarbons or to recover the separating agent for recycling to the initial contacting operation. The upper phase of the reaction mixture comprising non-extracted hydrocarbons or raffinate may be water-washed, fractionally distilled, or otherwise treated to recover a hydrocarbon fraction containing a lesser proportion of tertiary olefins and/or ethylenically phenyl-substituted olefins than the initial charging stock. The lower extract phase separated in the process comprising the reaction product of the extracted olefin or olefins and the separating agent may be heated with water or pyrolyzed in the absence of water to recover the aliphatic nitrile and the extracted tertiary olefin or phenyl substituted olefin, if the latter is the desired product of the reaction. The quantity of added water is preferably sufficient to hydrolyze the sulfate ester formed during the reaction, the hydrolytic reaction forming the corresponding carboxamide derivative by enolization of the hydrated ester. In order to effect the hydrolysis, the reaction mixture is preferably maintained at a temperature of from about 30° to about 100° C., for a period of from about one-half to about two hours, the reaction resulting in the formation of an insoluble upper layer in comprising the carboxamide derivative of the separated olefin. The upper phase acid amide derivative may be separated, for example, by decantation from the aqueous phase and separately pyrolyzed if desired to recover the extracted olefinic hydrocarbon and the aliphatic amine from the acid amide product. The decomposition of the acid amide is generally effected at temperatures of from about 50° to about 150° C. and when conducted in fractional distillation equipment, the aliphatic nitrile, extracted olefinic hydrocarbon and water may be simultaneously separated as distinct fractions. For this reason it is desirable to select the aliphatic nitrile reactant utilized in the process on the basis of its boiling point, which preferably differs substantially from the boiling point of the extracted hydrocarbon, thereby permitting ready separation of the aliphatic nitrile and extracted hydrocarbon following the pyrolysis of the carboxamide reaction product. It is to be emphasized, however, that when the desired object of the reaction is not to recover the extracted olefinic hydrocarbon as an end product of the process, but merely to remove the indicated separable classes of hydrocarbons from a hydrocarbon mixture containing the same, it is not essential to proceed with the hydrolysis of the initial reaction product, nor is it necessary to pyrolyize the carboxamide hydrolysis product following phase separation in the initial stage of the present process.

The present process although prima facie useful for the removal or segregation of tertiary olefins from hydrocarbon mixtures or for the recovery of alpha phenyl-substituted olefins from admixtures of the same with other hydrocarbons, as in the separation of styrene from ethylbenzene, a particularly useful application of the method is the removal of branched chain olefins from a hydrocarbon feed stock in which the relatively more straight chain hydrocarbons are desired for alkylation purposes, as in the preparation of detergents by the alkylation of aromatic hydrocarbons with olefins containing from 9 to about 18 carbon atoms per molecule where the straight chain olefins are particularly desirable in the production of alkylates for detergent manufacture. Another application of the present process is for the segregation of tertiary olefins for alkylation of isoparaffins yielding an alkylate composed primarily of branched chain hydrocarbons which is more desirable for the production of high octane gasoline than the corresponding straight chain hydrocarbons.

A typical process flow for affecting the separation embodied in the present invention is diagrammatically illustrated in the accompanying drawing. Referring to the drawing, a hydrocarbon mixture containing a tertiary olefinic hydrocarbon having a reactive ethylenic linkage substituted by dialkyl or monophenyl is charged into reaction zone 1 through line 2 and mixed therein with an aliphatic nitrile introduced into zone 1 through line 3, and sulfuric acid containing not more than about 10% by weight of water charged into the reaction zone through line 4. The mixed hydrocarbon feed stock may be dissolved in a suitable solvent therefor which is inert in the reaction, said solvent being charged to the process through line 5 and mixed with the reaction mixture in zone 1. Reaction zone 1 is maintained at a temperature sufficient to obtain the reaction of the tertiary olefin with the aliphatic nitrile and sulfuric acid, generally at temperatures of from about 0° to about 50° C. and at a pressure sufficient to maintain the reaction mixture in substantially liquid phase. The resulting mixture after a period of reaction sufficient to obtain the desired conversion of tertiary olefins is removed from zone 1 through line 6 into separation zone 7 wherein the mixture may be allowed to stratify into an unreacted hydrocarbon upper layer and a lower layer comprising the reaction product formed in zone 1. The upper layer of unreacted hydrocarbons, comprising predominantly non-tertiary olefins and/or paraffinic hydrocarbon components of the feed stock, is removed from zone 7 through line 8 and discharged from the process, or recycled to the feed stock charge line. The lower layer reaction product may be treated by several alternative methods, depending upon the type of separation desired. For example, the lower layer reaction product of the tertiary olefin with the aliphatic nitrile and the sulfuric acid formed in zone 1 may be diverted from zone 7 through line 9 into hydrolysis zone 10 into which water is introduced through line 11 and the resulting mixture reacted, usually with the aid of heat, to form the corresponding carboxamide derivatives of the reaction product of the tertiary olefin and aliphatic nitrile formed in zone 1. The resulting reaction mixture is removed from zone 10 through line 12 and supplied to separation zone 13 to effect the segregation of an aqueous product from an organic product which in the case of the hydrolytic method of treatment comprises the aforementioned carboxamide derivative. The aqueous product separating in zone 13 is removed therefrom through line 14 and discharged from the the process. The organic product resulting from the hydrolytic reaction is recovered from zone 13 through line 15.

In accordance with an alternative method of treating the lower phase reaction product formed in zone 1 and separated in zone 7, the latter product is diverted into line 16 from zone 7 and subjected to pyrolysis in zone 17. The products of the latter reaction are removed through line 18 connecting with line 12 which discharges the reaction products of the pyrolysis reaction into separation zone 13 wherein the pyrolysis reaction mixture is segregated into its constituents, for example, by distillation, as desired. The organic product of the reaction separated in zone 13 is removed therefrom through line 15.

The invention is further illustrated with respect to specific embodiments thereof in the following example which, however, is not intended to unduly restrict the scope of the invention in accordance therewith.

*Example*

A mixture of isobutylene and normal butylene containing 30% by weight of isobutylene, 20% by weight of normal butylene and the remainder normal and isobutane is utilized as a charging stock in the following separation process for the recovery of isobutylene. One hundred grams of the above mixture is charged into a rotating pressure autoclave followed by the introduction therein of 10 grams of 98.5% sulfuric acid, 40 grams (approximately 2 molar proportions based upon the quantity of isobutylene charge) of acetonitrile, and 100 cc. of glacial acetic acid. The mixture is stirred at a temperature of 30° C. by rotation of the pressure autoclave for a period of three hours and then cooled to −10° C. to maintain the hydrocarbons in liquid phase upon release of the pressure. A two-phase mixture forms upon standing which is separated by decantation. The upper, essentially hydrocarbon layer, weighs approximately 70 grams and consists primarily of n-butylene and normal and isobutane. The lower acidic phase separated from the reaction mixture is transferred to a closed container having a vent leading into a Dry Ice condenser in which volatile products may be liquefied at Dry Ice temperatures. The acidic phase is diluted with an equal volume of water and the reaction vessel is heated to a temperature of about 70° C., causing the evolution of a gas which condenses in the Dry Ice condenser. The residue remaining in the reaction vessel is primarily acetonitrile, water and sulfuric acid, while the liquefied condensed gas is substantially pure isobutylene. The liquid condensate weighs approximately 28 grams and is substantially pure isobutylene.

I claim as my invention:

1. A process for extracting a mixture of hydrocarbons containing an olefinic hydrocarbon component having an active ethylenic linkage in which one of the ethylenic carbon atoms of said olefin is substituted by a member of the group consisting of dialkyl and mono-phenyl, which comprises contacting said hydrocarbon mixture in liquid phase and at a temperature of from about 0° to about 50° C. with an organic solvent containing an aliphatic nitrile in at least an equimolar proportion based on the quantity of said olefinic component and also containing from about 10% to about 30% by weight of concentrated sulfuric acid based on the quantity of said nitrile, and separating from the resulting reaction mixture a raffinate phase comprising nonreacted hydrocarbons and an extract phase comprising the reaction product of said olefinic hydrocarbon component and said aliphatic nitrile.

2. The process of claim 1 further characterized in that the reaction mixture contains a molar excess of aliphatic nitrile, based upon the quantity of olefinic hydrocarbon component containing said active ethylenic linkage in said hydrocarbon mixture.

3. The process of claim 1 further characterized in that said reaction mixture contains from about one-half to about 4 moles of sulfuric acid based upon the quantity of reactive olefinic component containing said active ethylenic linkage in said mixture of hydrocarbons.

4. The process of claim 1 further characterized in that said mixture of hydrocarbons contains isobutylene.

5. The process of claim 1 further characterized in that said mixture of hydrocarbons contains styrene.

6. A process for recovering an olefinic hydrocarbon component from a mixture of hydrocarbons, said olefinic component containing a reactive ethylenic linkage substituted by a member of the group consisting of dialkyl and monophenyl which comprises contacting said hydrocarbon mixture in liquid phase and at a temperature of from about 0° to about 50° C. with an organic solvent containing an aliphatic nitrile in at least an equimolar proportion based on the quantity of said olefinic component and also containing from about 10% to about 30% by weight of concentrated sulfuric acid based on the quantity of said nitrile, separating from the resultant reaction mixture a raffinate phase comprising non-reactive hydrocarbons and an extract phase comprising the reaction product of said olefinic hydrocarbon component and said aliphatic nitrile, and heating said extract phase at a temperature sufficient to decompose said reaction product of said olefinic hydrocarbon component and aliphatic nitrile.

7. The process of claim 6 further characterized in that said extract phase is heated in the presence of water.

8. The process of claim 6 further characterized in that said extract phase is pyrolyzed at a temperature of from about 50° to about 150° C.

9. The process of claim 8 further characterized in that the products of said pyrolysis are separated and said olefinic component containing a reactive ethylenic linkage recovered.

JOSEPH A. CHENICEK.

REFERENCES CITED

The following references are of record in the file of this patent:

UNITED STATES PATENTS

| Number | Name | Date |
|---|---|---|
| 2,007,159 | Engs et al. | July 9, 1935 |
| 2,338,600 | Robey et al. | Jan. 4, 1944 |
| 2,407,820 | Durrum | Sept. 17, 1946 |
| 2,458,067 | Friedman et al. | Jan. 4, 1949 |